(12) United States Patent
Wilhide

(10) Patent No.: US 10,511,167 B2
(45) Date of Patent: Dec. 17, 2019

(54) ELECTRICAL POWER SYSTEM WITH MULTIPLE ENERGY STORAGE MODULES

(71) Applicant: Hamilton Sundstrand Corporation, Charlotte, NC (US)

(72) Inventor: Matthew L. Wilhide, Cherry Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 98 days.

(21) Appl. No.: 15/943,779

(22) Filed: Apr. 3, 2018

(65) Prior Publication Data
US 2019/0305550 A1    Oct. 3, 2019

(51) Int. Cl.
| | | |
|---|---|---|
| H02J 1/10 | (2006.01) | |
| H02J 7/34 | (2006.01) | |
| H02J 1/00 | (2006.01) | |
| G06F 1/26 | (2006.01) | |
| G05F 1/66 | (2006.01) | |
| G05B 15/02 | (2006.01) | |
| H02J 7/00 | (2006.01) | |

(52) U.S. Cl.
CPC ............... *H02J 1/00* (2013.01); *G05B 15/02* (2013.01); *G05F 1/66* (2013.01); *G06F 1/263* (2013.01); *H02J 1/10* (2013.01); *H02J 7/007* (2013.01); *H02J 7/345* (2013.01)

(58) Field of Classification Search
CPC ...... H02J 1/10; H02J 1/00; H02J 7/007; H02J 7/345; G05B 15/02; G05F 1/66; G06F 1/263
See application file for complete search history.

(56) References Cited

U.S. PATENT DOCUMENTS

| | | | |
|---|---|---|---|
| 9,733,657 B2 | 8/2017 | Ye et al. | |
| 9,753,511 B2 | 9/2017 | Ye et al. | |
| 2015/0194820 A1 | 7/2015 | Liang et al. | |
| 2017/0359010 A1* | 12/2017 | Rozman | H02P 9/02 |
| 2017/0373510 A1 | 12/2017 | Morita | |

OTHER PUBLICATIONS

Extended European Search Report for European Application No. 19166846.6 dated Jun. 12, 2019.

(Continued)

*Primary Examiner* — Carlos Amaya
(74) *Attorney, Agent, or Firm* — Carlson, Gaskey & Olds, P.C.

(57) ABSTRACT

An example electrical power system includes a DC bus including a positive rail configured to provide a positive DC voltage, a negative rail configured to provide a negative DC voltage, and a ground rail. A first ESM and a second ESM are connected to the DC bus. Each ESM includes an energy storage device. The first and second ESM are connected to and configured to provide an output voltage to a respective one of the positive and negative rail. A node connects the first and second ESMs to each other and to the ground rail. A controller is configured to determine values for the output voltages for use during at least one of a discharging mode and a charging mode bus based on a difference between a state of charge value of the first and second energy storage devices. A method of operating an electrical power system is also disclosed.

20 Claims, 4 Drawing Sheets

(56) References Cited

OTHER PUBLICATIONS

Zhang, Songjie et al. "Hierarchical Control Strategy of Hybrid Energy Storage System in Bipolar-Type DC Micro Grid," 2017 IEEE 3rd International Future Energy Electronics Conference and Ecce Asia, IEEE, Jun. 3, 2017, pp. 2223-2227.

Zheng, Huiping, et al. "A Control Strategy of Hybrid Energy Storage System in Bipolar-type DC Micro-grid," 2017 IEEE Conference on Energy Internet and Energy System Integration, IEEE, Nov. 26, 2017, pp. 1-6.

* cited by examiner

ELECTRICAL POWER SYSTEM WITH MULTIPLE ENERGY STORAGE MODULES

BACKGROUND

This application relates to electrical power systems, and more particularly to providing supplemental power to an electrical power system.

Vehicles, such as aircraft, often include electrical power systems with an on-board generator that converts rotational movement from an engine to electrical power. The generated electrical power is used to power on-board electrical components such as flight controls (e.g., ailerons and rudders), sensors, and/or other on-board electrical devices. These items collectively act as a baseline electrical load that requires a baseline amount of electrical power.

The vehicle may also include pulse loads that require supplemental power, causing a spike in the overall load of the electrical system. Some example pulse loads could include a radar or a directed energy weapon. On-board energy storage devices that charge from the generator can be used to provide supplemental power for pulse loads.

SUMMARY

An example electrical power system includes a direct current (DC) bus including a positive rail configured to provide a positive DC voltage, a negative rail configured to provide a negative DC voltage, and a ground rail. A first energy storage module (ESM) and a second ESM are connected to the DC bus. Each ESM includes an energy storage device. The first and second ESM are connected to and configured to provide an output voltage to a respective one of the positive and negative rail. A node connects the first and second ESMs to each other and to the ground rail. A controller is configured to determine values for the output voltages for use during at least one of a discharging mode in which the energy storage devices discharge onto the DC bus and a charging mode in which the energy storage devices charge from the DC bus based on a difference between a state of charge value of each of the first and second energy storage devices.

An example method of operating an electrical power system includes measuring a state of charge of each of a first energy storage device of a first ESM and a second energy storage device of a second ESM. The first ESM is connected to and configured to provide an output voltage to a positive rail of a DC bus that is configured to provide a positive DC voltage. The second ESM is connected to and configured to provide an output voltage to a negative rail of the DC bus that is configured to provide a negative DC voltage. A node connects the first and second ESMs to each other and to a ground rail of the DC bus. Values are determined for the output voltages for use during at least one of a discharging mode in which the energy storage devices discharge onto the DC bus and a charging mode in which the energy storage devices charge from the DC bus based on a difference between a state of charge value of each of the first and second energy storage devices.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
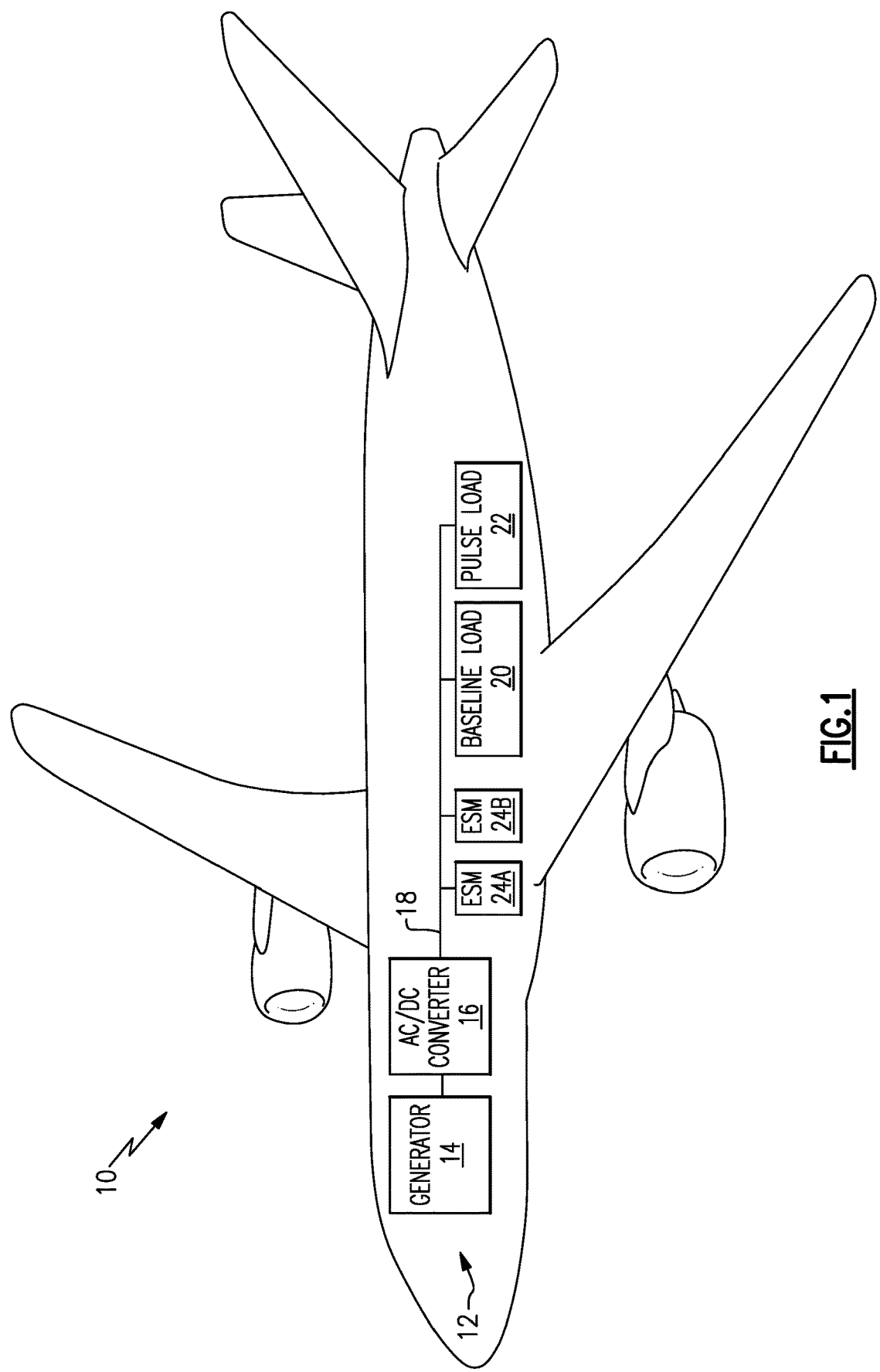
FIG. 1 is a schematic view of an example aircraft that includes a power control system.

FIG. 1 is a schematic view of an example aircraft 10 that includes an electrical power system 12. The electrical power system 12 includes a generator 14, AC/DC converter 16, and DC bus 18. The generator 14 converts rotational movement (e.g., of a rotor of a gas turbine engine) to electrical power. The AC/DC converter 16 converts an alternating current (AC) voltage from the generator 14 to a direct current (DC) voltage, and provides the DC voltage to the DC bus 18.

A baseline load 20 and one or more pulse loads 22 are powered over the DC bus 18. The baseline load 20 could include flight controls, sensors, and/or other electrical devices of the aircraft 10, for example. The pulse load 22 could include one or more of a radar device and a directed energy weapon, for example.

The electrical power system 12 includes a plurality of energy storage modules (ESMs) 24A-B that are configured to charge from the DC bus 18 in a charging mode, and to act as supplemental power stages by providing supplemental power to the DC bus 18 in a discharging mode when the one or more pulse loads 22 are utilized. Each pulse load 22 needs a relatively large amount of power over a relatively short time duration, and the ESM 24 is able to meet that power demand Although only two ESMs 24A-B are shown in FIG. 1, it is understood that additional ESMs could 24 be used if desired.

Figure 2:
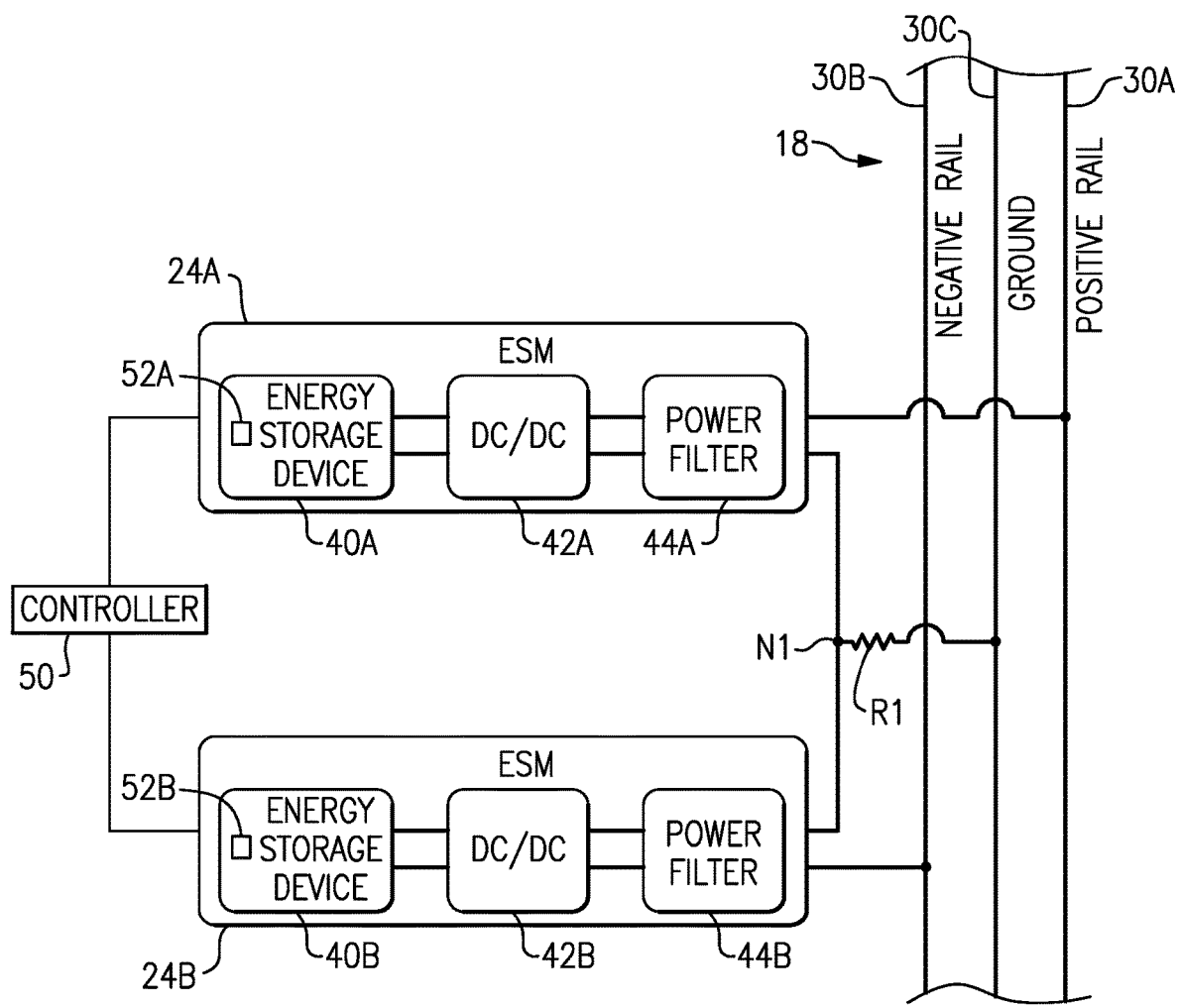
FIG. 2 is a schematic view of an example power control system that can be used in the aircraft of FIG. 1.

FIG. 2 is a schematic view of an example of the power control system 12. In the example of FIG. 2, the DC bus 18 is a split DC bus that includes a positive rail 30A that provides a positive voltage, a negative rail 30B that provides a negative voltage, and a ground rail 30C. A node N1 connects the ESMs 24A-B to each other and to the ground rail 30C. Thus, the ESMs 24A-B can be described as being stacked in series. Also, a resistor R1 is connected between the node N1 and the ground rail 30C. The resistor R1 limits a flow of current from the node N1 to the ground rail 30C.

In one example, the magnitude of positive voltage on positive rail 30A and the magnitude of the negative voltage on the negative rail 30B are approximately the same (e.g., on the order of 300 volts). In such an example, the DC bus 18 can be said to provide a voltage of ±300 volts, or a "total bus voltage" of 600 volts.

In the case of a vehicle such as an aircraft, the ground rail 30C may be a neutral rail that acts as a ground. In such an example, the ground rail 30C could connect to a chassis of the vehicle or a neutral terminal of the generator 14, for example.

Each ESM 24 includes at least one energy storage device 40, a DC/DC converter 42, and a power filter 44. The energy storage devices 40 can include a variety of devices, such as batteries, fuel cells, and ultracapacitors, for example. Ultracapacitors are high-capacity capacitors that can typically store 10-100 times more energy per unit volume or mass than electrolytic capacitors. In one example, each ESM 24A-B includes the same type of energy storage device 40.

Certain types of energy storage devices 40 are well-suited for certain types of pulse loads. For example, ultracapacitors are well-suited for the power requirements of radar pulse loads, whereas batteries are well-suited for the energy requirements of laser pulse loads.

The DC/DC converters 42 provide an output voltage from their respective energy storage devices 40A-B to the DC bus. In particular, DC/DC converter 42A provides an output voltage to positive rail 30A, and DC/DC converter 42B provides an output voltage to negative rail 30B. As used herein, the "output voltage" of an ESM 24 refers to the output voltage of its DC/DC converter 42 to the DC bus 18.

The DC/DC converters 42 are operable as buck/boost converters to adjust the voltage on the DC bus 18 with respect to the voltage of their respective energy storage device 40.

In one example, the voltages of the energy storage devices 40 have a lower magnitude than that of the DC bus. As an example, the DC bus 18 may have a voltage of ±300 volts (i.e., approximately +300 volts on positive rail 30A and −300 volts on negative rail 30B), and each energy storage device 40 may have a voltage on the order of 150 volts. In such an example, the DC/DC converters 42 operate in a buck mode when charging the energy storage devices 40 and operate in a boost mode when discharging the energy storage devices 40.

In the buck mode, the DC/DC converters 42 convert the larger magnitude DC voltage from the respective rail 30 to which the ESM 24 is connected to a lower magnitude DC voltage for charging the energy storage device 40. This is also known as "sinking" current from the DC bus 18.

In the boost mode, the DC/DC converters 42 convert the lower magnitude voltages of the energy storage devices 40 to the higher magnitude voltages of the respective rail 30 to which the ESM 24 is connected for discharging the energy storage devices 40 onto the DC bus. This is also known as "sourcing current" to the DC bus 18.

Power filters 44A-B provide for electromagnetic interference (EMI) filtering when charging or discharging the energy storage devices 40.

A controller 50 controls an output that each DC/DC converter 42 provides to the DC bus 18 to control whether the ESMs 24 are in the discharging mode or the charging mode. If the sum of magnitude of the output voltages (e.g., 300 volts from ESM 24A and −300 volts from ESM 24B, for a "total ESM voltage" of 600 volts) is the same as the total DC bus voltage (e.g., 600 volts), the ESMs 24 will be "off" (i.e., connected to and providing a voltage to the DC bus 18, but neither charging nor discharging). If the sum of the magnitude of the output voltages is greater than the total DC bus 18 voltage, the ESMs 24 enter the discharging mode and will provide power to the DC bus 18 for discharging. Conversely, if the sum of the magnitude of the discharge voltages is less than the total DC bus voltage, the ESMs 24 will enter the charging mode and will draw power from the DC bus 18 for charging.

Because the voltage on the DC bus 18 may vary in actual operational conditions (e.g., it may actually be 598 volts or 602 volts instead of 600 volts), the controller 50 monitors the DC bus 18 voltage and adjusts the ESM 24 discharge voltages to be either above or below the DC bus 18 voltage based on whether the controller 50 wants the ESMs 24 to charge, discharge, or be connected in the off state in which the ESMs 24 are neither discharging nor charging. A "midpoint" refers to DC/DC converter 42 output voltage values that match that of the DC bus 18, such that the ESMs 24 are in the off state.

The controller 50 could include a microprocessor, application-specific integrated circuit (ASIC), or the like, for example.

Each energy storage device 40 has a "state of charge" (SoC) which refers to a charge level of the energy storage device 40, and is akin to a fuel gauge for an energy storage device 40. A SoC is generally measured as a percentage, where a SoC of 0 means that an energy storage device 40 has no charge and is "empty" and a SoC of 100 means that an energy storage device 40 is fully charged and is "full."

During operation of the electrical power system 12, it is possible that the SoC values of the energy storage devices 40 may diverge. This can occur due to variations in efficiency between the ESMs 24, for example. If left uncorrected, this divergence can lead to an overvoltage fault condition within one of the ESMs 24 due to overcharging, and could also lead to undercharging of another of the ESMs 24. The controller 50 is operable to determine a difference between a SoC of each of the energy storage devices 40 using respective sensors 52A-B, and to determine values for the DC/DC converter 42 output voltages for either of the discharging and charging modes based on a difference between the SoC values of the energy storage devices 40A-B. The values are determined such that when they are implemented, the difference between the SoC values will decrease.

Figure 3:
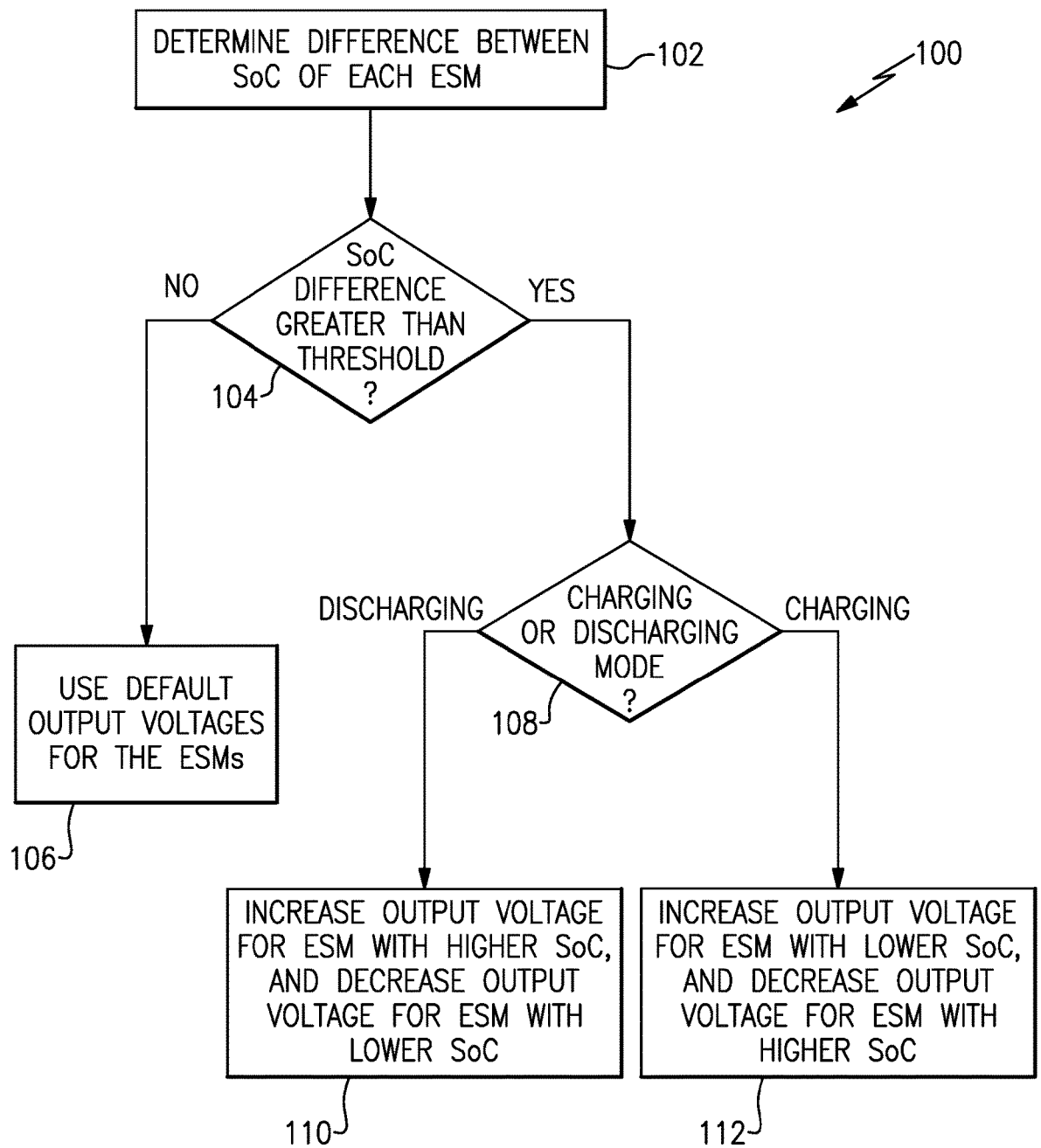
FIG. 3 summarizes an example method of operating an electrical power system in a flowchart diagram.

FIG. 3 summarizes an example method of operating the electrical power system 12 in a flowchart diagram 100. The controller determines a difference between the SoC of ESM 24A and the SoC of ESM 24B at 102, and determines whether a difference between the SoC values is greater than a predefined threshold at 104. In one example, the predefined threshold is a difference of 2% between the SoC values.

If the difference is less than the threshold (a "no" at 104), the controller 50 uses default values for the output voltages at 106. As used herein, "default values" means that the magnitude of the output voltage for each of the ESMs 24 is approximately the same as one another, whether in the charging mode, discharging mode, or off state.

If the SoC difference is greater than the predefined threshold (a "yes" at 104), the controller 50 determines whether the ESMs 24A-B are in the charging or discharging mode. The controller 50 then adjusts the respective DC/DC converter 42 output voltages for the ESMs 24.

In particular, if the ESMs 24 are discharging, the controller 50 increases the output voltage for the ESM 24 having the higher SoC value, and decreases the output voltage for the ESM 24 having the lower SoC voltage at 110. This forces the ESM 24 having the higher SoC value to provide more power to the DC bus 18 than the ESM 24 having the lower SoC value.

Conversely, if the ESMs 24 are charging, the controller 50 increases the output voltage for the ESM 24 having the lower SoC value, and decreases the output voltage for the ESM 24 having the higher SoC voltage at 112. This forces the ESM 24 having the lower SoC value to draw more power from the DC bus 18 than the ESM 24 having the higher SoC value.

Either of the adjustments 110, 112 causes the difference between the respective SoC values of the ESMs 24 to decrease.

In one example, the increase and decrease implemented in either of the adjustments 110, 112 have a same magnitude. Thus, if X volts is added to the discharge voltage of one of the ESMs 24 at 110, X volts is subtracted from the discharge voltage of the other of the ESMs 24. In a similar example, if Y volts is added to the charging voltage of one of the ESMs 24 at 112, Y volts is subtracted from the charging voltage of the other of the ESMs 24. In a non-limiting example, X and Y could be approximately 25 volts.

In one example, the output voltage adjustments of 110, 112 are gradually implemented over an implementation period (e.g., on the order of several minutes). In particular, to increase the output voltage for one of the ESMs 24 (whether charging or discharging), the controller 50 is configured to gradually implement a voltage increase for the one of the ESMs 24 from a current value to an increased target value; and to decrease the output voltage for the other of the ESMs 24, the controller 50 is configured to gradually implement a voltage decrease for said one of the ESMs from a current value to a decreased target value. If during the gradual adjustments, the SoC difference between the ESMs 24 falls below the predefined threshold, then the gradual adjustments can be ceased and use of the default output voltages can be resumed. The gradual adjustments avoids large instantaneous changes to the output voltages.

Figure 4:
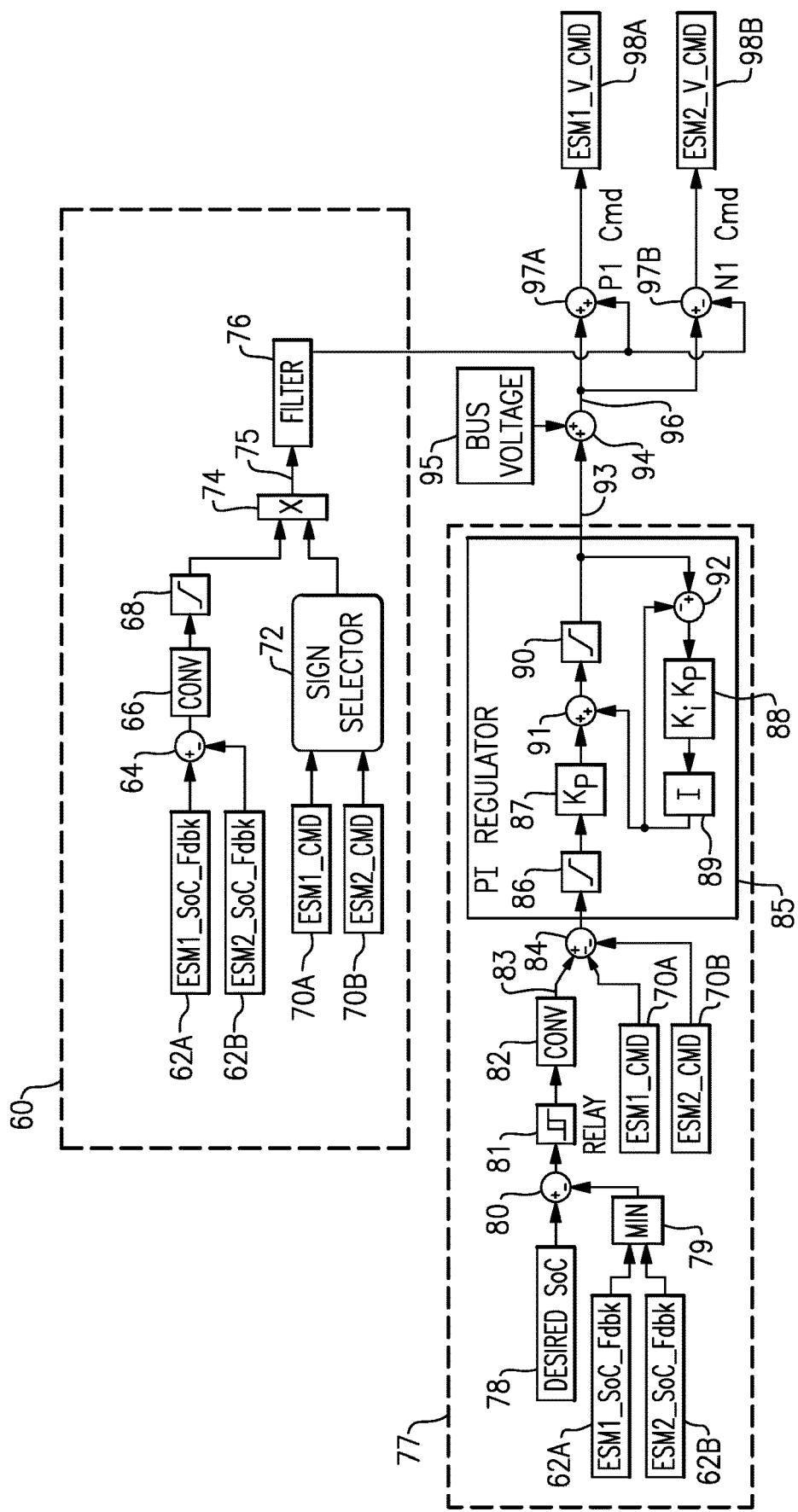
FIG. 4 illustrates an example implementation of the method of FIG. 3.

FIG. 4 illustrates an example of how controller 50 could implement the method of FIG. 3. In a voltage adjustment determination section 60, the controller 50 determines a voltage adjustment to be implemented in either 110 or 112. In particular, the controller 50 receives a SoC value for ESM 24A (shown as 62A with label "ESM1_SoC_Fdbk") and a SoC value for ESM 24B (shown as 62B with label "ESM2_SoC_Fdbk"). A summer 64 determines a difference between the SoC values 62A-B, and a conversion block 66 converts that SoC difference from a percentage value to a current value. If the current value from conversion block 66 is non-zero, a limiter 68 provides a predefined adjustment amount to be used for each of the DC/DC converter 42 output voltages (i.e., to be subtracted from one of the output voltages and added to another of the output voltages). In one example, the predefined adjustment amount is approximately 25 volts.

A current command for ESM 24A (shown as 70A with label "ESM1_Cmd") and a current command for ESM 24B (shown as 70B with label "ESM2_Cmd") are input into a sign selector 72 that determines whether the ESMs 24A-B are charging, discharging, or are in the off state during which they are neither charging nor discharging. In one example, if the ESMs 24A-B are discharging/sourcing current to the DC bus 18, the current commands 70A-B have positive values, and the sign selector 72 outputs a value of 1. If the ESMs 24A-B are charging from/sinking current from the DC bus, the commands 70A-B have negative values, and the sign selector 72 outputs a value of −1. If the ESMs 24A-B are in the off state, the current commands 70A-B have a value of 0, and the sign selector outputs a value of 0.

A multiplier 74 multiples the output of the sign selector 72 by the output of the limiter 68 and provides a target voltage adjustment 75 as an output. If the output of sign selector 72 is zero (indicating that the ESMs 24 are in the off state) or the output of limiter 68 is zero (indicating that the ESMs 24 have the same SoC), then the target voltage adjustment 75 is zero.

However, if the target voltage adjustment 75 is non-zero, a filter 76 (e.g., a low pass filter) implements the gradual adjustment feature above, so that instead of immediately implementing the predefined adjustment amount (e.g., ±25 volts), the controller 50 incrementally adjusts the DC/DC converter 42 output voltages to implement the voltage adjustment 75 over a time period (e.g., on the order of several minutes).

The controller 50 also includes a trim section 77. In a first portion of the trim section 77 (prior to element 84), the controller 50 determines whether a difference between the respective SoC values 62A-B of each ESM 24A-B exceeds the predefined difference threshold, and in a second portion of the trim section 77 (element 84 and after) the controller 50 calibrates a voltage of the ESMs 24A-B to that of the DC bus 18.

In the discussion below, a "total ESM voltage" of the ESMs 24 refers to a sum of the magnitude of the output voltage of each DC/DC converter 42. Thus, if one provides +300 volts and one provides −300 volts, the total ESM voltage would be 600 volts. If the total voltage of the ESMs 24 matches the total bus voltage on the DC bus 18, then the ESMs 24 will neither charge nor discharge. If the total ESM voltage of the ESMs 24 exceeds that of the DC bus 18 the ESMs 24 will discharge, and if the total ESM voltage of the ESMs 24 is less than that of the DC bus 18 the ESMs will charge. Because the actual voltage on the DC bus 18 as provided by the generator 14 and AC/DC converter 16 may vary based on operational conditions, it is useful to calibrate the ESMs 24 to that actual voltage to avoid inadvertent charging or discharging. The trim section 77 provides that calibration.

A desired SoC 78 is provided corresponding to a desired SoC for each of the ESMs (e.g., a 90% SoC). Block 79 determines a minimum between the ESM SoC values 62A-B, and a summer 80 determines a difference between the desired SoC 78 and that minimum value. If both ESMs 24 have a SoC that is equal to the desired SoC, then they are deemed fully charged at the desired SoC level. If the output of summer 80 is non-zero, indicating a differential between the SoC of ESM 24 and ESM 24B, a relay 81 is used to determine whether the difference meets the predefined SoC difference threshold discussed above (e.g., of 2%). If that threshold is met, the relay 81 turns on an adjustment function to decrease the SoC difference. A converter 82 converts the percentage to a desired current for each ESM 24.

The remainder of the trim algorithm section 77 calibrates the voltage of the ESMs 24 to an actual voltage of the DC bus 18. A summer 84 determines a difference between the desired current command 83 and the presently-used current commands 70A-B, and provides that difference to a proportional integral (PI) regulator 85 as a current error.

A PI regulator 85 provides an anti-windup feature for quickly switching between the charging and discharging modes of the ESMs 24. As the current error calculated in summer 84 enters PI regulator 85, it is initially limited by saturation block 86. The output of saturation block 86 is multiplied by the proportional gain 87 Kp to obtain the proportional response of the PI regulator 85. The proportional response is added to the integral I response by summer 91. The output of the PI regulator 85 is limited by the saturation block 90.

The integral response is calculated by taking the output of the PI regulator 85 and subtracting the integral I term by sum block 92. The output of summation block 92 is multiplied by KiKp 88. This value is then integrated by the integrator block 89.

The PI regulator 85 provides a voltage trim command 93 that indicates an amount that the each ESM output voltage should be adjusted to be calibrated with the DC bus 18 (i.e., a midpoint adjustment) to avoid inadvertent charging or discharging. The voltage trim command 93 is summed with the magnitude of the bus voltage 95 on either of the rails 30A, 30B by summer 94 to obtain an adjusted bus voltage 96.

This adjusted bus voltage 96 is summed with the filtered voltage adjustment 75 by summers 97A and 97B to determine a voltage command for ESM 24A (shown as 98A with label "ESM1_V_Cmd") and voltage command for ESM 24B (shown as 98B with label "ESM1_V_Cmd"). Which one of the voltage commands 98 is an increase and which is a decrease depends on the output of the sign selector 72.

The embodiments discussed herein provide for improved efficiency in the electrical power system 12 by avoiding the overvoltage conditions possible when utilizing ESMs 24 having differing SoC values. Weight reduction may also occur due to a reduction in a number of battery cells required to reach a desired voltage level (e.g., 600 volts). If one were to build a 600 volt battery, it would typically require many heavy cells. By using the ESMs 24A-B, however, one can build a system that is lighter and uses fewer cells while still providing the desired voltage (e.g., with one ESM providing+300 volts, and the other providing −300 volts).

Although certain voltage values are discussed here above, it is understood that they are non-limiting example values, and that other voltages could be used.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. An electrical power system, comprising:
   a direct current (DC) bus comprising a positive rail configured to provide a positive DC voltage, a negative rail configured to provide a negative DC voltage, and a ground rail;
   a first energy storage module (ESM) and a second ESM connected to the DC bus, each ESM comprising an energy storage device and each ESM connected to and configured to provide an output voltage to a respective one of the positive and negative rails, a node connecting the first and second ESMs to each other and to the ground rail; and
   a controller configured to determine values for the output voltages for use during at least one of a discharging mode in which the energy storage devices discharge onto the DC bus and a charging mode in which the energy storage devices charge from the DC bus based on a difference between a state of charge value of each of the first and second energy storage devices.

2. The electrical power system of claim 1, wherein each ESM includes a DC/DC converter that connects its respective energy storage device to the DC bus, and the output voltages are DC/DC converter output voltages.

3. The electrical power system of claim 1, wherein the controller is configured to control the output voltages to decrease the difference.

4. The electrical power system of claim 1, wherein the controller is configured to:
   utilize default values for the output voltages based on the difference being below a predefined threshold; and
   utilize adjusted values that differ from the default values for the output voltages based on the difference exceeding the predefined threshold.

5. The electrical power system of claim 4, wherein to utilize the adjusted voltages, the controller is configured to:
   increase the output voltage for one of the ESMs; and
   decrease the output voltage for the other of the ESMs.

6. The electrical power system of claim 5, wherein in the discharging mode, the controller is configured to:
   select the ESM that has a first state of charge value as said one of the ESMs; and
   select the ESM that has a second state of charge value that is lower than the first state of charge value as said other of the ESMs.

7. The electrical power system of claim 5, wherein in the charging mode, and the controller is configured to:
   select the ESM that has a first state of charge value as said one of the ESMs; and
   select the ESM that has a second state of charge value that is higher than the first state of charge value as said other of the ESMs.

8. The electrical power system of claim 5, wherein:
   to increase the output voltage for one of the ESMs, the controller is configured to gradually implement a voltage increase for said one of the ESMs from a current value to an increased target value; and
   to decrease the output voltage for the other of the ESMs, the controller is configured to gradually implement a voltage decrease for the other of the ESMs from a current value to a decreased target value.

9. The electrical power system of claim 8, wherein the controller is configured to cease the gradual implementation of the voltage increase prior to reaching the increased target value and cease the gradual implementation of the voltage decrease prior to reaching the decreased target value based on the difference between the state of charge values becoming less than the predefined difference threshold.

10. The electrical power system of claim 8, comprising:
    a generator configured to charge the energy storage devices over the DC bus and power a first load over the DC bus that is separate from the ESMs;
    wherein a magnitude of the increased target value is greater than a magnitude of a voltage provided by the generator to either of the positive and negative rails; and
    wherein a magnitude of the decreased target value is less than a magnitude of a voltage provided by the generator to either of the positive and negative rails.

11. The electrical power system of claim 8, wherein a magnitude of each of the voltage increase and voltage decrease is approximately the same.

12. The electrical power system of claim 1, comprising:
    a generator configured to power a first load over the DC bus that is separate from the ESMs;
    wherein the ESMs are configured to provide supplemental power to a second load over the DC bus in the discharging mode, and the second load is a pulse load and is different from the first load.

13. The electrical power system of claim 1, wherein the energy storage device of each of the first ESM and second ESM includes an ultracapacitor or a battery.

14. A method of operating an electrical power system, comprising:
    measuring a state of charge of each of a first energy storage device of a first energy storage module (ESM) and a second energy storage device of a second ESM, the first ESM connected to and configured to provide an output voltage to a positive rail of a DC bus, the second ESM connected to and configured to provide an output voltage to a negative rail of the DC bus, the positive rail configured to provide a positive DC voltage, the negative rail configured to provide a negative DC voltage, and a node connecting the first and second ESMs to each other and to a ground rail of the DC bus; and determining values for the output voltages for use during at least one of a discharging mode in which the energy storage devices discharge onto the DC bus and a charging mode in which the energy storage devices charge from the DC bus, the determining based on a difference between a state of charge value of each of the first and second energy storage devices.

15. The method of claim 14, wherein said determining comprises:

determining default values for the output voltages based on the difference being below a predefined threshold; and determining adjusted values that differ from the default values for the output voltages based on the difference exceeding the predefined threshold.

16. The method of claim 14, comprising:

controlling a DC/DC converter of each ESM that couples the energy storage device of the ESM to the DC bus to utilize a respective one of the output voltages for charging its associated energy storage device from the DC bus in the charging mode or for discharging its associated energy storage device onto the DC bus in the discharging mode.

17. The method of claim 16, wherein the controlling decreases the difference.

18. The method of claim 16, wherein in the discharging mode, the controlling comprises:

increasing the output voltage for one of the ESMs that has a first state of charge value; and decreasing the output voltage for the other of the ESMs that has a second state of charge value that is lower than the first state of charge value.

19. The method of claim 16, wherein in the charging mode, the controlling comprises:

increasing the output voltage for one of the ESMs that has a first state of charge value; and decreasing the output voltage for the other of the ESMs that has a second state of charge value that is higher than the first state of charge value.

20. The method of claim 14, comprising:

powering a first load over the DC bus from a generator, the first load separate from the ESMs; and powering a second load over the DC bus in the discharging mode, wherein the second load is a pulse load and is different from the first load.

* * * * *